(12) United States Patent
Pardo et al.

(10) Patent No.: US 7,142,352 B2
(45) Date of Patent: Nov. 28, 2006

(54) MEMS MIRROR WITH AMPLIFIED MOTION

(75) Inventors: Flavio Pardo, New Providence, NJ (US); Maria Elina Simon, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 58 days.

(21) Appl. No.: 11/093,512

(22) Filed: Mar. 30, 2005

(65) Prior Publication Data

US 2006/0227409 A1    Oct. 12, 2006

(51) Int. Cl.
*G02B 26/08* (2006.01)
(52) U.S. Cl. ............... 359/298; 359/290; 359/291; 359/295
(58) Field of Classification Search ........ 359/290, 359/291, 223, 224, 295, 298
See application file for complete search history.

(56) References Cited

U.S. PATENT DOCUMENTS

| 6,600,851 | B1 | 7/2003 | Aksyuk et al. | ............... 385/18 |
| 6,781,744 | B1 | 8/2004 | Aksyuk et al. | ............. 359/290 |

*Primary Examiner*—Timothy Thompson
*Assistant Examiner*—Jerry Fang
(74) *Attorney, Agent, or Firm*—Eugene J. Rosenthal

(57) ABSTRACT

A MEMS device achieves a large angle of rotation of a plate about 2 independent axes by employing a handle portion of the plate which is isolated by respective springs coupling the handle portion to each of two actuators. A first actuator, which rotates the mirror about the same axis as done in U.S. Pat. No. 6,781,744 is essentially the same structure disclosed therein, but with the mirror plate thereof shrunken in size. This shrunken plate is coupled by a spring to the mirror plate of the instant invention. Movement of the shrunken plate causes corresponding movement of the handle portion, and hence the mirror. A second actuator, coupled by another spring to the mirror plate of the instant invention, rotates about a second axis that is perpendicular to the first axis and parallel to the substrate. The second actuator includes an actuator plate and an electrode thereunder.

29 Claims, 4 Drawing Sheets

MEMS MIRROR WITH AMPLIFIED MOTION

TECHNICAL FIELD

This invention relates to micro-electromechanical systems (MEMS), and more particularly, to MEMS devices that use amplified motion to move a plate.

BACKGROUND OF THE INVENTION

Optical communication equipment often employs one or more micro-electromechanical systems (MEMS) devices. A typical MEMS device may include an array of micromachined mirrors, with each mirror being individually movable in response to an electrical signal. Such an array may be employed in an optical cross-connect, in which each mirror in the array receives a different beam of light, for example, from an input optical fiber. The beam is reflected from the mirror and can be redirected to a different location, e.g., a location at which an output optical fiber is located. The particular output fiber that receives the redirected beam may be selected by rotating the mirror. Other optical applications for MEMS devices include wave selective switches, add-drop switches, wavelength attenuators, and wavelength blockers. Non-optical applications are also possible.

One problem with prior art MEMS devices having relatively large mirrors, e.g., between 100 µm and 400 µm in length and between 30 µm and 70 µm in width, is that the height of the gap between the mirror and the corresponding actuating electrode(s) has to be relatively large, i.e., greater 8 µm, to achieve relatively large, e.g., about 10 degree, rotation angles. However, an 8 µm gap height is the best that can be achieved with surface micromachine technology, which is a simple and low cost fabrication technique.

U.S. Pat. No. 6,781,744, which is incorporated by reference as if fully set forth herein, discloses a MEMS device having a movable mirror and a movable actuator plate mechanically that are coupled together such that a relatively small displacement of the plate results in rotation of the mirror by a relatively large angle. In one exemplary arrangement, the mirror and actuator plate are supported on a substrate. The actuator plate moves in response to a voltage difference applied between a) an electrode located on the substrate beneath the plate and b) the plate itself. One or more springs attached to the plate provide a counteracting restoring force when they are stretched from their rest positions by the plate motion. The mirror has a handle portion configured as a lever arm. A spring attached between the actuator plate and the handle portion transfers the motion of the actuator plate to the mirror such that, when the actuator plate moves toward the substrate, the spring pulls the handle portion to move the mirror away from the substrate. Advantageously, relatively large mirror rotation angles may be achieved using the relatively small displacements of the actuator plate that can be achieved using surface micromachine technology.

In another exemplary arrangement disclosed in U.S. Pat. No. 6,781,744, a MEMS device has first and second plates, each supported on, and positioned offset from, a substrate. The second plate is rotatably connected to the substrate. The connection defines a rotation axis and first and second portions of the second plate including its opposite ends with respect to the rotation axis. One end of the first plate is movably connected to the first portion of the second plate, while the other end of the first plate is connected to the substrate.

Disadvantageously, U.S. Pat. No. 6,781,744 only teaches how to achieve rotation by a relatively large angle around a single axis.

SUMMARY OF THE INVENTION

We have developed a MEMS device that can achieve a relatively large angle of rotation of a plate, which may be a mirror about two independent axes using surface micromachine technology. In accordance with the principles of the invention, a handle portion of the plate is isolated by respective springs coupling it to each of two actuators. A first actuator, which rotates the mirror about the same axis as is done in U.S. Pat. No. 6,781,744 is essentially the same structure disclosed therein as described above, but with the mirror plate thereof shrunken in size. This shrunken plate is coupled by a spring to the mirror plate of the instant invention. Movement of the shrunken plate causes corresponding movement of the handle portion, and hence the mirror. A second actuator, coupled by another spring to the mirror plate of the instant invention, rotates about a second axis that is perpendicular to the first axis but is parallel to the substrate. The second actuator is made up of an actuator plate with an electrode thereunder. This second actuator plate may be long and narrow, and its electrode may be so too. The electrode is made narrower than the actuator plate, so that if snapdown does occur, the actuator plate will not contact the electrode.

Advantageously, in some embodiments of the invention, each spring may be optimized to primarily allow torsion in only one direction and with relative rigidity in all other directions. Advantageously, amplified motion need only be employed for motion about the first axis, since the actuator used for motion about the second axis 1) may be narrow enough that it can rotate a considerable amount, e.g., 10 degrees, without touching the substrate, and 2) may be designed to achieve the force necessary to rotate the mirror plate, as there is no inherent geometrical restriction on its length.

DETAILED DESCRIPTION

The following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function. This may include, for example, a) a combination of electrical or mechanical elements which performs that function or b) software in any form, including, therefore, firmware, microcode or the like, combined with appropriate circuitry for executing that software to perform the function, as well as mechanical elements coupled to software controlled circuitry, if any. The invention as defined by such claims resides in the fact that the functionalities provided by the various recited means are combined and brought together in the manner which the claims call for. Applicant thus regards any means which can provide those functionalities as equivalent as those shown herein.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

The term micro-electromechanical systems (MEMS) device as used herein is intended to mean an entire MEMS device or any portion thereof. Thus, if a portion of a MEMS device is inoperative, or if a portion of a MEMS device is occluded, such a MEMS device is nonetheless considered to be a MEMS device for purposes of the present disclosure.

In the description, identically numbered components within different ones of the FIGs. refer to the same components.

Figure 1:
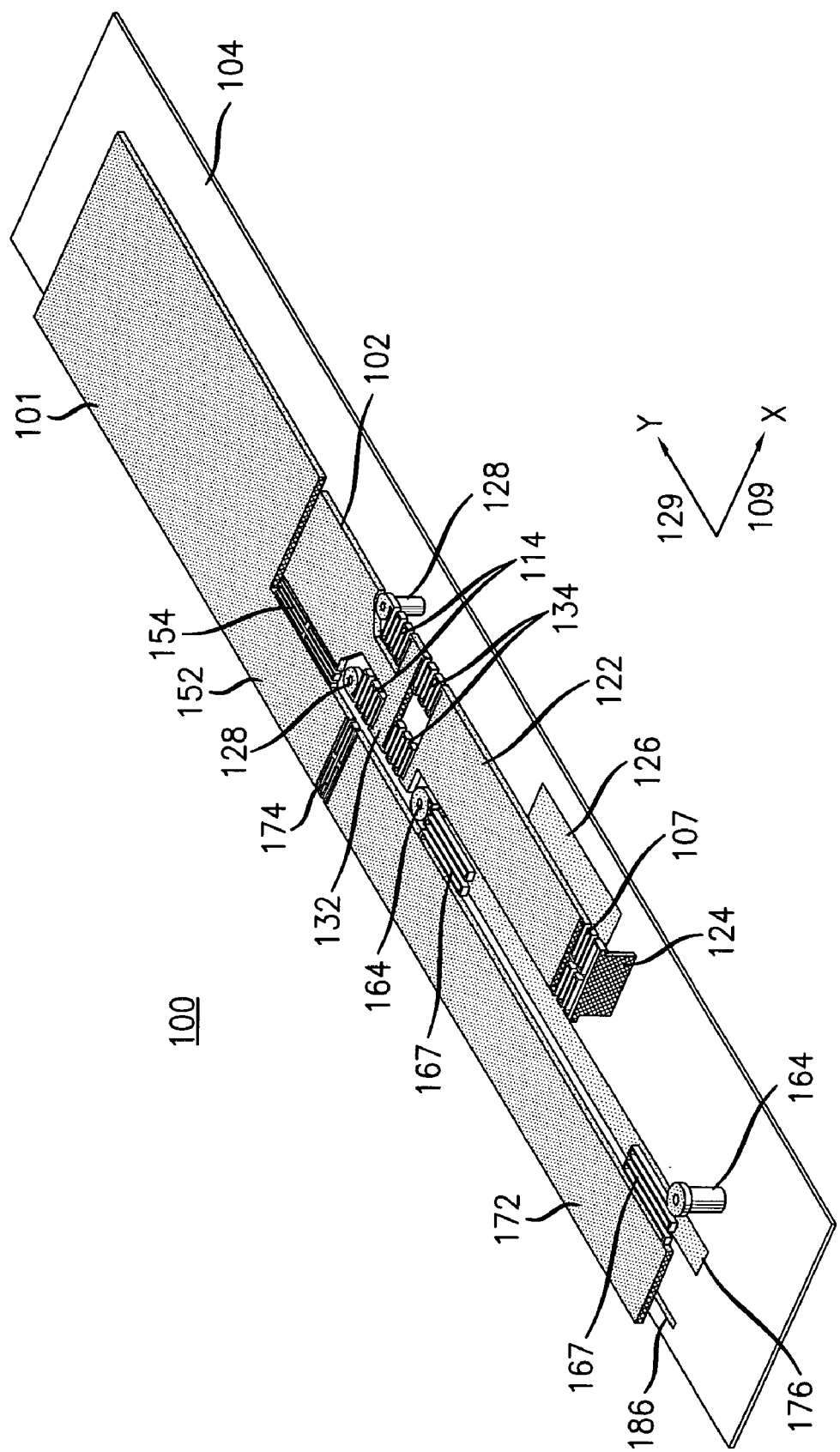
FIG. 1 shows a perspective view of exemplary MEMS device, which is arranged in accordance with the principles of the invention

FIG. 1 shows a perspective view of exemplary MEMS device 100, which is arranged in accordance with the principles of the invention. MEMS device 100 includes a movable mirror 101, which is rotatable about a first axis parallel to x-direction 109 by virtue of it being mechanically coupled to coupling plate 102, which is in turn coupled to movable actuator plate 122, all of which are suspended off of substrate 104. One end of movable actuator plate 122 is attached to substrate 104 using spacer 124, and the other end of movable actuator plate 122 is coupled to coupling plate 102. In MEMS device 100 the end of movable actuator plate 122 adjacent to spacer 124 is fixedly attached thereto by at least one torsional element 107. Torsional element 107 may be implemented as a spring, and it is preferably adapted to permit movable actuator plate 122 to rotate substantially only about an axis parallel to x-direction 109. Note that x-direction 109 is not an element of MEMS device 100 but is shown for pedagogical purposes only.

Electrode 126 is located on substrate 104 beneath movable actuator plate 122. Movable actuator plate 122 and electrode 126 form an electrostatic actuator of device 100. When electrode 126 is biased with respect to movable actuator plate 122, movable actuator plate 122 rotates about an axis parallel to x-direction 109. Preferably, moveable actuator plate 122 remains substantially undeformed in its rest position and in all positions to which it rotates.

Coupling plate 102 is supported above substrate 104 by at least one torsional member 114, e.g., one or more springs, each of which is attached between at least one of stationary posts 128 and handle portion 132 of coupling plate 102. At least one torsional member 134 is attached between handle portion 132 of coupling plate 102 and the suspended end of movable actuator plate 122 so as to mechanically couple together coupling plate 102 and movable actuator plate 122.

In operation, as the end of movable actuator plate 122 coupled to coupling plate 102 moves down toward substrate 101, handle portion 132 of coupling plate 102 likewise moves downward. This in turn causes the non-handle portion of plate 102 to move upward. This is described in more detail in U.S. Pat. No. 6,781,744, e.g., in connection with FIG. 3 thereof, except that coupling plate 102 of the instant invention takes the place of the mirror therein.

The motion induced by movable actuator plate 122 in coupling plate 102 is coupled via at least one torsional element 154 to handle portion 152 of mirror 101. Torsional element 154, e.g., a spring, is designed so that it preferably transfers all of the torque in the x-direction of coupling plate 102 to mirror 101. In addition, torsional element 154 is preferably adapted to permit coupling plate 102 to rotate substantially only about an axis parallel to y-direction 129. Note that y-direction 129 is not an element of MEMS device 100 but is shown for pedagogical purposes only. Advantageously, the motion of movable actuator plate 122 about a direction parallel to x-direction 109 is transferred as the component of motion about x-direction 109 of mirror 101, while motion of mirror 101 about an axis in a direction parallel to y-axis 129 is not transferred to movable actuator plate 122.

Movable mirror 101 is also rotatable about a second axis perpendicular to x-direction 109, e.g., y-axis 129, by virtue of it being mechanically coupled to movable actuator plate 172, all of which are suspended off of substrate 104. One side of movable actuator plate 172 is attached to substrate 104 using posts 164 and torsional elements 167, e.g., springs, while the opposite side of movable actuator plate 172 is suspended above substrate 104. Torsional elements 167, e.g., springs, are preferably arranged to permit movable actuator plate 172 to rotate substantially only about an axis parallel to y-direction 129.

Electrode 176 is located on substrate 104 beneath movable actuator plate 172. Movable actuator plate 172 and electrode 176 form an electrostatic actuator of device 100. Preferably, when electrode 176 is biased with respect to movable actuator plate 172, movable actuator plate 172 rotates substantially undeformed about an axis parallel to y-direction 129.

Movable actuator plate 172 is coupled via torsional element 174, e.g., a spring, to handle portion 152 of mirror 101. The motion induced by movable actuator plate 172 is coupled via torsional element 174 to handle portion 152 of mirror 101. Torsional element 174 is designed so that it preferably transfers all of the torque in the y-direction to handle portion 152 of mirror 101. In addition, torsional element 174 is preferably adapted to permit movable actuator plate 172 to rotate substantially only about an axis parallel to y-direction 129. Advantageously, the motion of movable actuator plate 172 about a direction parallel to y-axis 129 is transferred as the component of motion about y-axis 129 of mirror 101, while motion of mirror 101 about an axis in a direction parallel to x-direction 109 is not transferred to movable actuator plate 172.

Thus, mirror 101 may be rotated about axes in either of the x and y directions, or about both simultaneously and independently.

Optionally, to reduce the possibility of snapdown of movable actuator plate 172, optional electrode 186 may be placed on substrate 104 beyond the footprint of movable actuator plate 172. Advantageously, optional electrode 186, which may be coupled to the same source as electrode 176, counters the tendency toward snapdown as the potential difference between movable actuator plate 172 increases, while being located so that in the event that snapdown does occur, a short circuit will not result between movable actuator plate 172 and optional electrode 186. See, for example, U.S. Pat. No. 6,600,851 B2, which is incorporated by reference as if set forth fully herein.

Figure 2:
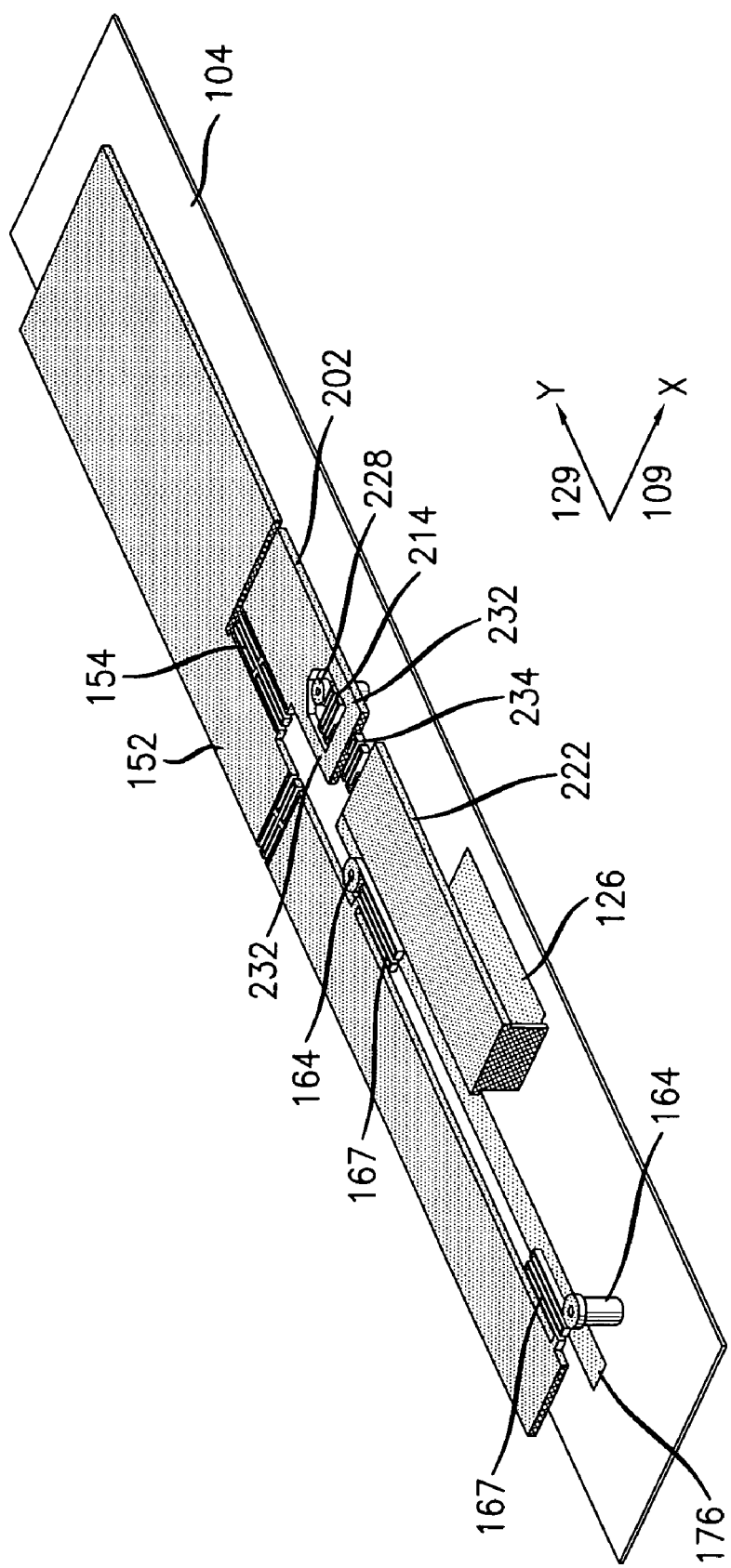
FIG. 2 shows an embodiment of the invention, similar to that shown in FIG. 1, but in which the movable actuator plate and spacer of FIG. 1 are connected together, e.g., formed of a unitary piece of material, thereby forming an actuator plate.

FIG. 2 shows MEMS device 200, an embodiment of the invention, similar to MEMS device 100 (FIG. 1), but in which movable actuator plate 122 and spacer 124 of MEMS device 100 are connected together, e.g., formed of a unitary piece of material, thereby forming actuator plate 222 in FIG. 2. However, in such an embodiment of the invention, it is more likely that actuator plate 222 will bend or deform, e.g., similar to a springboard.

One end of movable actuator plate 222 is attached to substrate 104, while the other end of movable actuator plate 222 is coupled to coupling plate 202.

Coupling plate 202 is supported above substrate 104 by at least one torsional member 214, e.g., one or more springs, each of which is attached between at least one of stationary posts 228 and handle portion 232 of coupling plate 202. At least one torsional member 234 is attached between handle portion 232 of coupling plate 202 and the suspended end of movable actuator plate 222 to mechanically couple together coupling plate 202 and movable actuator plate 222. As the end of movable actuator plate 222 coupled to coupling plate 202 moves down toward substrate 101, handle portion 232 of coupling plate 202 likewise moves downward. This in turn causes the non-handle portion of plate 202 to move upward.

The motion induced by movable actuator plate 222 in coupling plate 202 is coupled via at least one torsional element 154 to handle portion 152 of mirror 101. The remaining elements of FIG. 2, and their operation, are the same as for FIG. 1.

Figure 3:
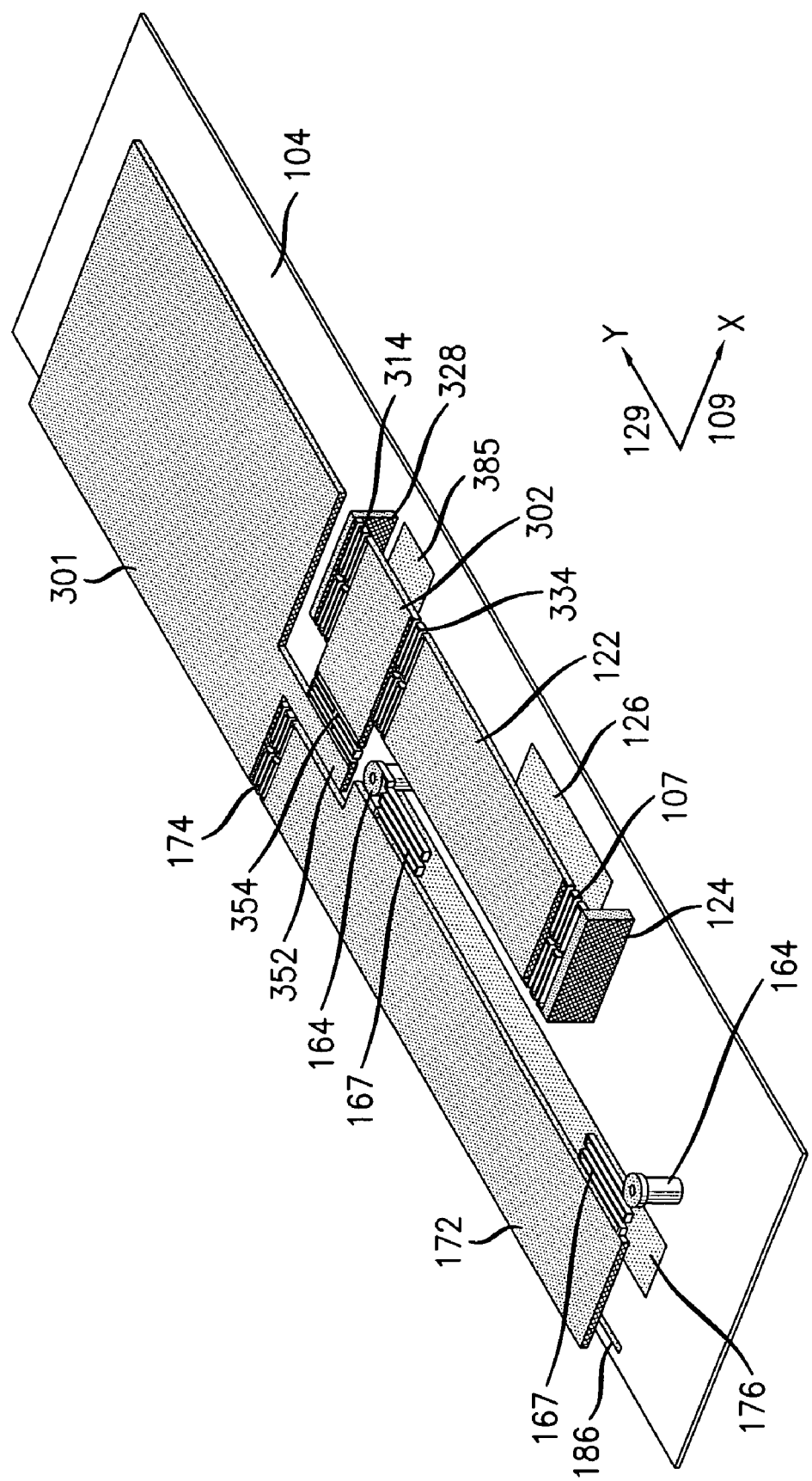
FIG. 3 shows a perspective view of exemplary MEMS device, similar to that shown in FIG. 1, which is arranged in accordance with the principles of the invention.

FIG. 3 shows a perspective view of exemplary MEMS device 300, similar to MEMS device 100 (FIG. 1), which is arranged in accordance with the principles of the invention. MEMS device 300 (FIG. 3) includes a movable mirror 301, which is rotatable about a first axis parallel to x-direction 109 by virtue of it being mechanically coupled to coupling plate 302, which is in turn coupled to movable actuator plate 122, all of which are suspended off of substrate 104. One end of movable actuator plate 122 is attached to substrate 104 using spacer 124, and the other end of movable actuator plate 122 is coupled to coupling plate 302. In MEMS device 300, the end of movable actuator plate 122 adjacent to spacer 124 is fixedly attached thereto by at least one torsional element 107. Torsional element 107 may be implemented as a spring, and it is preferably adapted to permit movable actuator plate 122 to rotate substantially only about an axis parallel to x-direction 109.

Electrode 126 is located on substrate 104 beneath movable actuator plate 122. Movable actuator plate 122 and electrode 126 form an electrostatic actuator of device 100. When electrode 126 is biased with respect to movable actuator plate 122, movable actuator plate 122 rotates about an axis parallel to x-direction 109. Preferably, moveable actuator plate 122 remains substantially undeformed in its rest position and in all positions to which it rotates.

Coupling plate 302 is supported above substrate 104 by at least one torsional member 314, e.g., one or more springs, each of which is attached between one end of coupling plate 302 and at least one stationary support 328. At least one torsional member 334 is attached between the opposite end of coupling plate 302 and the suspended end of movable actuator plate 122 so as to mechanically couple together coupling plate 302 and movable actuator plate 122.

In operation, as the end of movable actuator plate 122 coupled to coupling plate 302 moves down toward substrate 301, the end of coupling plate 302 coupled thereto likewise moves downward. This effectively rotates coupling plate 302 downward about an axis in the x-direction that passes through the top of stationary support 328. Optional electrode 385 can be used to induce additional torque in the rotation of coupling plate 305. Optional electrode 385 should be sized smaller than coupling plate 302 so that in the event of snapdown of a short circuit does not result.

The rotation of coupling plate 302 effectively rotates torsional element 354, which is coupled to coupling plate 302, in the same direction about the same axis. Torsional element 354, e.g., a spring, is designed so that it preferably transfers all of the torque about the x-direction of coupling plate 302 to handle portion 352 of mirror 301. This in turn causes mirror 301 to rotate about the same axis. Thus, when the end of movable actuator plate 122 coupled to coupling plate 302 moves down toward substrate 104, the non-handle portion of mirror 301 rises away from substrate 104.

Note that, torsional element 354 is preferably adapted to permit coupling plate 302 to rotate substantially only about an axis parallel to y-direction 129. Advantageously, the motion of movable actuator plate 122 about a direction parallel to x-direction 109 is transferred as the component of motion about x-direction 109 of mirror 301, while rotation of mirror 301 about an axis in a direction parallel to y-direction 129 is not transferred to movable actuator plate 122.

Movable mirror 301 is also rotatable about a second axis perpendicular to x-direction 109, e.g., y-direction 129, by virtue of it being mechanically coupled to movable actuator plate 172, all of which are suspended off of substrate 104. One side of movable actuator plate 172 is attached to substrate 104 using posts 164 and torsional elements 167, e.g., springs, while the opposite side of movable actuator plate 172 is suspended above substrate 104. Torsional elements 167 are preferably arranged to permit movable actuator plate 172 to rotate substantially only about an axis parallel to y-direction 129.

Electrode 176 is located on substrate 104 beneath movable actuator plate 172. Movable actuator plate 172 and electrode 176 form an electrostatic actuator of device 100. Preferably, when electrode 176 is biased with respect to movable actuator plate 172, movable actuator plate 172 rotates, substantially undeformed, about an axis parallel to y-direction 129.

Movable actuator plate 172 is coupled via torsional element 174, e.g., a spring, to handle portion 352 of mirror 301. The motion induced by movable actuator plate 172 is coupled via torsional element 174 to handle portion 352 of mirror 301. Torsional element 174 is designed so that it preferably transfers all of the torque in the y-direction to handle portion 352 of mirror 301. In addition, torsional element 174 is preferably adapted to permit movable actuator plate 172 to rotate substantially only about an axis parallel to y-direction 129. Advantageously, the motion of movable actuator plate 172 about a direction parallel to y-direction 129 is transferred as the component of motion about y-direction 129 of mirror 301 while motion of mirror 301 about an axis in a direction parallel to x-direction 109 is not transferred to movable actuator plate 172.

Thus, mirror 301 may be rotated about axes in either of the x and y directions, or about both simultaneously and independently.

Optionally, to reduce the possibility of snapdown of movable actuator plate 172, optional electrode 186 may be placed on substrate 104 beyond the footprint of movable actuator plate 172. Advantageously, optional electrode 186, which may be coupled to the same source as electrode 176, counters the tendency toward snapdown as the potential difference between movable actuator plate 172 increases, while being located so that in the event that snapdown does occur, a short circuit will not result between movable actuator plate 172 and optional electrode 186.

Figure 4:
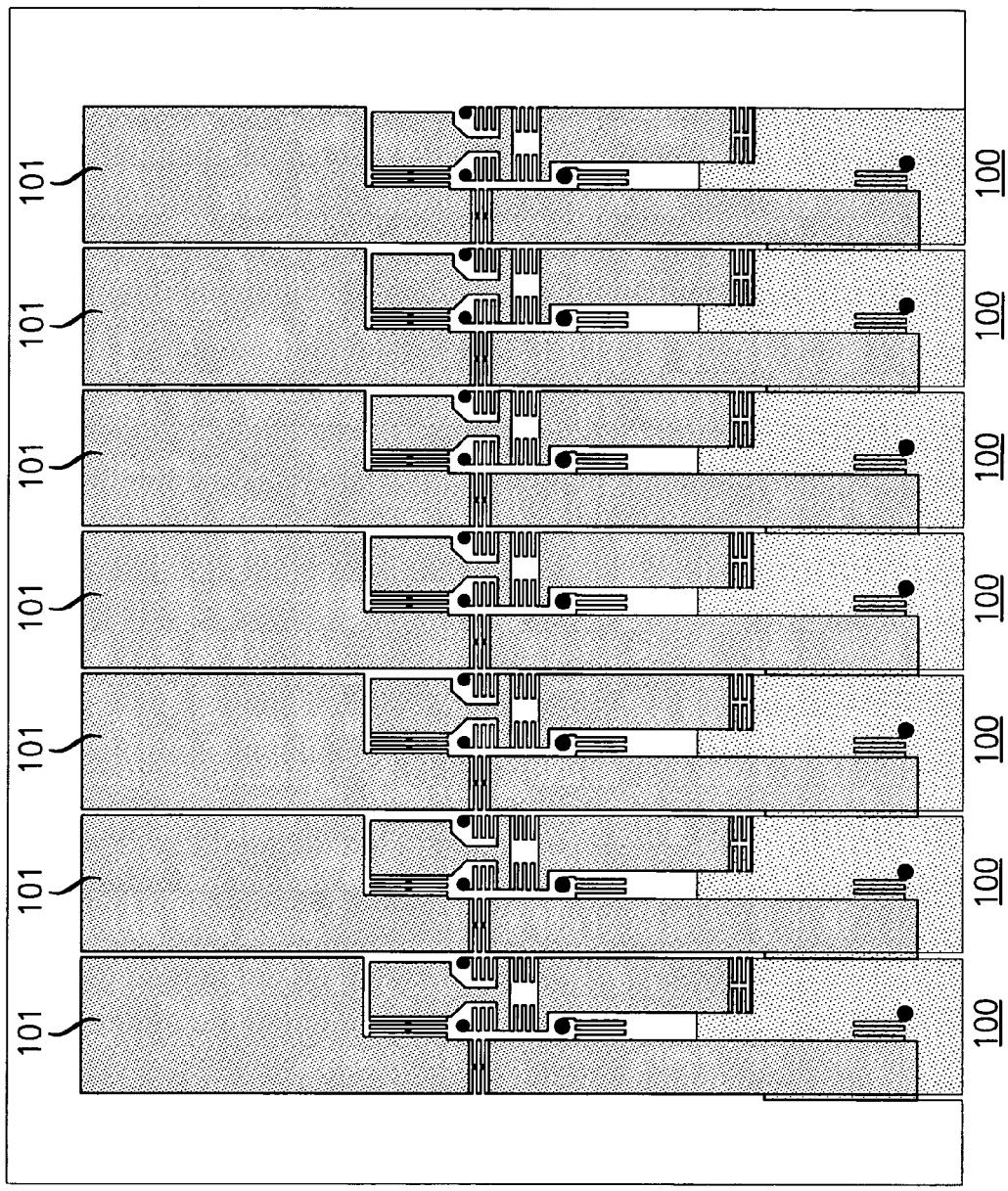
FIG. 4 shows an exemplary arrangement of several of the MEMS device of FIG. 1, arranged in a one-dimensional array.

FIG. 4 shows an exemplary arrangement in which several of MEMS device 100 (FIG. 1), are organized as a one-dimensional array. Advantageously, mirrors 101 of each MEMS device 100, can be packed closely together.

Note that those of ordinary skill in the art will readily recognize that other types of drives, e.g., comb drives may be employed in lieu of flat electorodes.

What is claimed is:

1. A micro-electromechanical systems (MEMS) device, comprising:
   a first actuator comprising first and second movable plates, each supported on and positioned offset from a substrate, wherein each of said first and second plates is adapted to move with respect to said substrate, said first plate is adapted to move in response to a voltage applied between a first electrode and said first plate, and said first and second plates are mechanically coupled together such that motion of said first plate with respect to said substrate produces motion of said second plate with respect to said substrate and with respect to said first plate;
   a second actuator comprising a second electrode and a third movable plate, said third moveable plate being supported on, and positioned offset from, said substrate, wherein said third moveable plate is adapted to move with respect to said substrate in response to a voltage applied between said second electrode and said third moveable plate;
   a fourth plate having a handle portion;
   wherein said handle portion of said fourth plate is mechanically coupled to said second plate such that motion of said second plate with respect to said substrate produces motion of said fourth plate with respect to said substrate in the same direction as that of said motion of said second plate and said handle portion of said fourth plate is mechanically coupled to said third plate such that motion of said third plate with respect to said substrate produces motion of said fourth plate with respect to said substrate in the same direction as that of said motion of said third plate.

2. The invention as defined in claim 1 wherein said second plate is supported by a spring attached between said second plate and a stationary post supported on said substrate.

3. The invention as defined in claim 1 wherein said fourth plate is coupled to said second plate by a spring attached between them.

4. The invention as defined in claim 1 wherein said second plate rotates about a first axis, and wherein said fourth plate is coupled to said second plate so that motion of said fourth plate about an axis different than said first axis does not substantially move said second plate.

5. The invention as defined in claim 1 wherein said third plate rotates about a first axis, and wherein said fourth plate is coupled to said third plate so that motion of said fourth plate about an axis different than said first axis does not substantially move said third plate.

6. The invention as defined in claim 1 wherein motion of said fourth plate in said direction of motion of said second plate is substantially independent of motion of said fourth plate in the direction of motion of said third plate.

7. The invention as defined in claim 1 wherein said fourth plate is coupled to said third plate by a spring attached between them.

8. The invention as defined in claim 1 wherein said first and second plates are coupled together by a spring attached between them.

9. The invention as defined in claim 1 further wherein said first actuator comprises a third electrode located beneath said second movable plate.

10. The invention as defined in claim 9 wherein said third electrode is sized and located so that in the event of snapdown of said first moveable plate, said third moveable plate will not contact said second electrode.

11. The invention as defined in claim 1 wherein said second actuator further comprises a fourth electrode that is located outside the path of motion of said third moveable plate.

12. The invention as defined in claim 1 wherein said first moveable plate is supported by a stationary support on said substrate.

13. The invention as defined in claim 1 wherein said first moveable plate has an integrated portion that supports said first moveable plate offset from said substrate, said first moveable plate and said integrated portion forming a unitary piece of material.

14. The invention as defined in claim 1 wherein said fourth plate includes a reflective portion on at least one of its surfaces.

15. The invention as defined in claim 1 wherein said fourth plate is a mirror.

16. The invention as defined in claim 1 wherein said first moveable plate is formed of a material such that said first plate remains substantially undeformed when it is moved out of its rest location.

17. The invention as defined in claim 1 wherein said third plate is formed of a material such that said third plate remains substantially undeformed when it is moved out of its rest location.

18. The invention as defined in claim 1 wherein said first electrode is sized and located so that in the event of snapdown of said first moveable plate, said first moveable plate will not contact said first electrode.

19. The invention as defined in claim 1 wherein said second electrode is sized and located so that in the event of snapdown of said third moveable plate, said third moveable plate will not contact said second electrode.

20. The invention as defined in claim 1 wherein said second moveable plate is supported by a single post.

21. The invention as defined in claim 1 wherein said first actuator is a comb drive, said first moveable plate and said first electrode each having comb teeth facing each other.

22. The invention as defined in claim 1 wherein said second actuator is a comb drive, said third moveable plate and said second electrode each having comb teeth facing each other.

23. A micro-electromechanical systems (MEMS) device, comprising:
   a first means for moving a first plate to rotate about a first axis with angle amplification with respect to the motion of a second plate;
   a second means for moving a third plate to rotate about a second axis; and
   means for transferring the motion of said first and third plates to a fourth plate, such that said fourth plate is rotated about said first axis directly proportionately to the motion of said first plate about said first axis and said fourth plate is rotated about said second axis directly proportionately to the motion of said third plate about said second axis, wherein said motion of said fourth plate about said first axis and said motion of said fourth plate about said second axis is substantially independent one from the other.

24. The invention as defined in claim 23 wherein at least one of said first and second means for moving includes a comb drive.

25. The invention as defined in claim 23 wherein at least one of said first and second means for moving includes a plate drive.

26. The invention as defined in claim 23 said means for transferring includes at least one spring coupling said first plate to said fourth plate.

27. The invention as defined in claim 23 said means for transferring includes at least one spring coupling said second plate to said fourth plate.

28. A method of operating a micro-electromechanical systems (MEMS) device comprising the step of rotating a first plate about each of two axes independently, with respect to a rest position, wherein said first plate is rotated about the first of said axes by virtue of being coupled to a second plate that is rotated through the use of angle amplification with respect to rotation of a third plate, and said first plate is rotated about the second of said axes by virtue of being coupled to a fourth plate that is rotated without the use of angle amplification.

29. An array of a plurality of micro-electromechanical systems (MEMS) devices, wherein each of said MEMS devices comprises:
   a first actuator comprising first and second movable plates, each supported on and positioned offset from a substrate, said second plate being supported by a spring attached between said second plate and a stationary post supported on said substrate, wherein each of said first and second plates is adapted to move with respect to said substrate, said first plate is adapted to move in response to a voltage applied between a first electrode and said first plate, and said first and second plates are mechanically coupled together such that motion of said first plate with respect to said substrate produces motion of said second plate with respect to said substrate and with respect to said first plate;
   a second actuator comprising a second electrode and a third movable plate, said third moveable plate being supported on, and positioned offset from, said substrate, wherein said third moveable plate is adapted to move with respect to said substrate in response to a voltage applied between said second electrode and said third moveable plate;
   a fourth plate having a handle portion;
   wherein said handle portion of said fourth plate is mechanically coupled to said second plate such that motion of said second plate with respect to said substrate produces motion of said fourth plate with respect to said substrate in the same direction as that of said motion of said second plate and said handle portion of said fourth plate is mechanically coupled to said third plate such that motion of said third plate with respect to said substrate produces motion of said fourth plate with respect to said substrate in the same direction as that of said motion of said third plate.

* * * * *